United States Patent [19]

Ziaylek, Jr.

[11] Patent Number: 4,550,931
[45] Date of Patent: Nov. 5, 1985

[54] WHEELED CONTAINER, ESPECIALLY FOR USE BY FIRE-FIGHTING AND RESCUE SQUADS

[76] Inventor: Theodore Ziaylek, Jr., 140 Riverview Dr., Yardley, Pa. 19067

[21] Appl. No.: 536,131

[22] Filed: Sep. 26, 1983

[51] Int. Cl.$^4$ ............................................. B62B 1/12
[52] U.S. Cl. .................... 280/655; 280/47.26
[58] Field of Search ...................... 280/33.99 T, 47.26, 280/638, 35, 655, 652, 47.27, 47.35, 524, 47.37 R

[56] References Cited

U.S. PATENT DOCUMENTS

| | | | |
|---|---|---|---|
| 284,881 | 9/1883 | Morrison | 280/47.35 |
| 2,925,283 | 2/1960 | Stilger | 280/655 |
| 2,926,021 | 2/1960 | Altadonna | 280/47.26 |
| 3,118,685 | 1/1964 | Jordan | 280/47.26 |
| 3,606,372 | 9/1971 | Browning | 280/655 |
| 3,876,223 | 4/1975 | O'Reilly et al. | 280/47.19 |
| 3,897,080 | 7/1975 | Isom | 280/47.19 |
| 3,900,202 | 8/1975 | Doble | 280/8 |
| 3,960,252 | 6/1976 | Ibrahim | 280/638 |
| 4,066,156 | 1/1978 | Basile | 280/47.26 |
| 4,087,102 | 5/1978 | Sprague | 280/638 |
| 4,118,048 | 10/1978 | Spranger | 280/47.35 |
| 4,120,549 | 10/1978 | Bureau | 280/47.35 |
| 4,147,369 | 4/1979 | Simpson | 280/30 |
| 4,261,447 | 4/1981 | Arias | 280/47.26 |
| 4,420,166 | 12/1983 | Law et al. | 280/5.24 |
| 4,466,628 | 8/1984 | Zerver | 280/47.35 |

FOREIGN PATENT DOCUMENTS

1376745  12/1974  United Kingdom ................ 280/652

OTHER PUBLICATIONS

"Zico Hose Related Products" Copyright 1978, p. 7, Hi-Rise Wheeled Pac.

*Primary Examiner*—David M. Mitchell
*Attorney, Agent, or Firm*—Sperry, Zoda & Kane

[57] ABSTRACT

A wheeled container includes a base receptacle of box-like, rectangular configuration, having recessed wheels at one end and a handle that telescopes to a non-use position to impart to the receptacle a generally rectangular outer configuration adapting it to fit into small, correspondingly shaped storage compartments of fire-fighting or rescue vehicles. The container is modular in the sense of permitting, if desired, the addition of one or more second receptacles, in a stacked arrangement upon the base receptacle. A cover is removably seated on either the base receptacle or, if additional receptacles are used, upon the uppermost additional receptacle.

6 Claims, 4 Drawing Figures

WHEELED CONTAINER, ESPECIALLY FOR USE BY FIRE-FIGHTING AND RESCUE SQUADS

BACKGROUND OF THE INVENTION

1. Field Of The Invention

The present invention relates generally to the field of dollies or hand trucks, and in a more particular sense, has reference to those devices under this general category, adapted for being collapsed into a compact, readily storable form when not in use.

2. Description Of The Prior Art

Heretofore, it has been proposed to provide dollies or hand trucks, designed for being collapsed into compact forms, to facilitate their storage in small areas.

Devices of this type, however, have heretofore been designed primarily for such uses as transporting luggage, food, or articles of general utility.

An important need has developed, in fire-fighting and rescue squad operations, for transporting hose, fire-fighting tools, oxygen equipment, or the like, at maximum speed, to remote areas of buildings under serious emergency conditions. For example, it is often necessary to transport additional hose to the upper stories of high level buildings during a fire in which there has been an elevator stoppage, to the stand pipe area nearest the fire scene in a high-rise building In other situations, breathing apparatus may be needed in the upper stories of high-rise buildings when dense smoke is encountered.

It has been heretofore proposed to provide wheeled packs of fire-fighting equipment, that a firefighter can pull upstairs or over floor surfaces of great area. However, these have not been entirely satisfactory, by reason of the fact that they cannot be expanded to accommodate additional tools, and very importantly, are not designed specifically for compact storage in the rectangular, pre-existing storage compartments of typical fire-fighting and rescue squad vehicles. Rather, equipment such as has already been devised for this purpose needs to be strapped to the vehicle exteriors, or attached by special brackets. This has presented a continuing problem in the fire-fighting and rescue field, which the present invention seeks to eliminate or reduce to an acceptable minimum.

SUMMARY OF THE INVENTION

Summarized briefly, the present invention includes, as a main component thereof, a base receptacle, which essentially comprises an upwardly opening, rectangular body in which any of various tools or pieces of fire-fighting equipment can be stored. The receptacle at one end has recessed sides receiving ground wheels, in an arrangement in which the ground wheels project to a minimum extent beyond the rectangular outer configuration of the receptacle.

To the underside of the receptacle there is secured a pair of skids, which project downwardly from the receptacle a distance at least as great as the downward projection of the wheels, whereby the receptacle, when laid flat upon a floor surface, will be supported primarily upon the skids, so as to be relatively immovable and stable during the extraction of hose, tools, and other items stored in the receptacle. A U-shaped handle telescopes within tubes also secured to the underside of the base receptacle, and a plunger extends directly through the skids so as to hold the handle in extended position when the device is in use.

One or more auxiliary receptacles are provided, each of rectangular box-like form, adapted to be supported upon the base receptacle to provide additional storage areas for tools and other equipment. A cover is supportable upon the uppermost receptacle. The several receptacles, with the handle means collapsed, provide a rectangular assembly, adapted to fit into a correspondingly shaped storage compartment of a fire-fighting or rescue vehicle.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENTS

Figure 1:
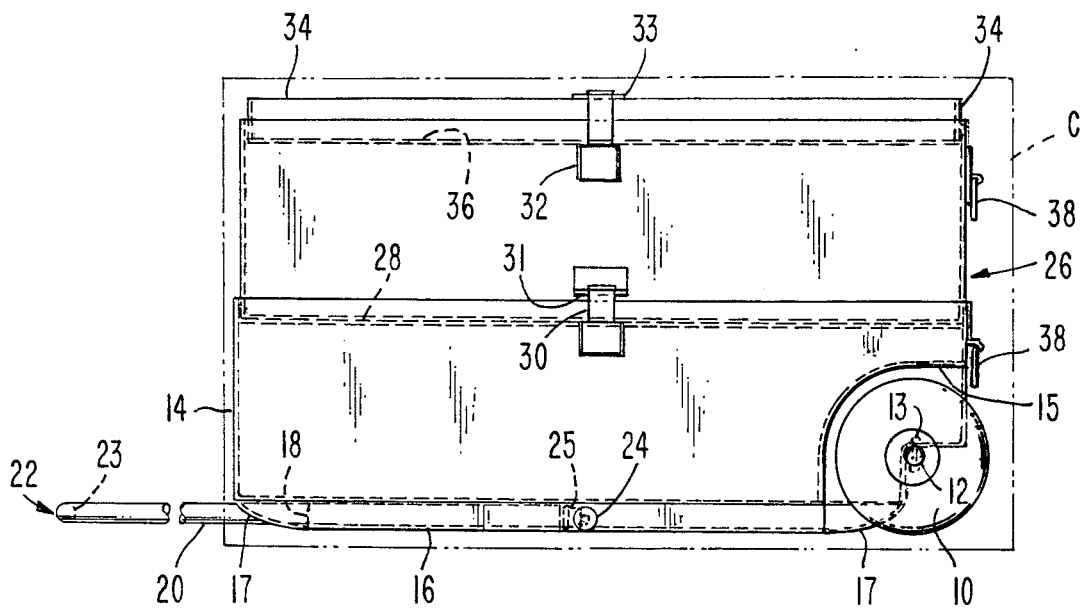
FIG. 1 is a side elevational view of a wheeled container according to the present invention, in which an auxiliary receptacle is supported upon the base receptacle, the handle being extended and being partly broken away.

Referring to the drawing in detail, the present invention includes a pair of ground wheels 10 mounted upon the ends of a transverse axle 12, riveted at 13 (FIG. 2) to the underside of a rectangular, upwardly opening base receptacle 14 the side walls of which are formed with recessed wells 15 for the respective wheels 10.

Figure 2:
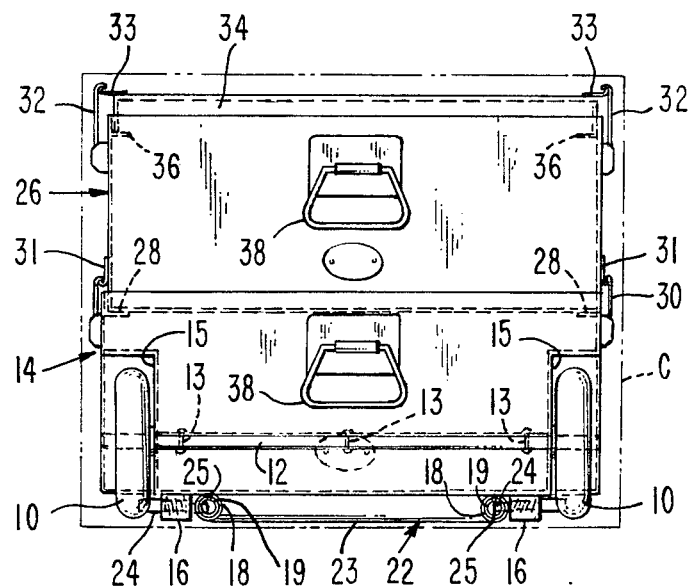
FIG. 2 is an end elevational view of the device as seen from the riiht of FIG. 1.

To the underside of the base receptacle there is welded or otherwise fixedly secured a pair of transversely spaced, parallel, longitudinally extending, elongated skids 16 each of which is preferably of rectangular cross section as shown in FIG. 2. Skids 16 extend the full length of the underside or bottom wall of receptacle 14, and have curvingly tapered ends 17 merging into the plane of the receptacle bottom wall.

Laterally inwardly of the respective skids 16, there are provided elongated handle support tubes 18 formed open at their opposite ends, and disposed in side-by-side relation to the skids. Tubes 18 are welded or otherwise fixedly secured to the bottom of the base receptacle, and extend approximately half the length of the skids.

The respective tubes 18 receive the end portions 19 (see FIG. 2) of the parallel side rails 20 of a U-shaped handle 22 having a bail 23 that provides a grip for the user. The U-shaped handle, when the device is not in use, slidably telescopes within tubes 18 to a fully recessed position in which the bail 23 will not project beyond the end wall of the base receptacle remote from the wheels 10.

Figure 3:
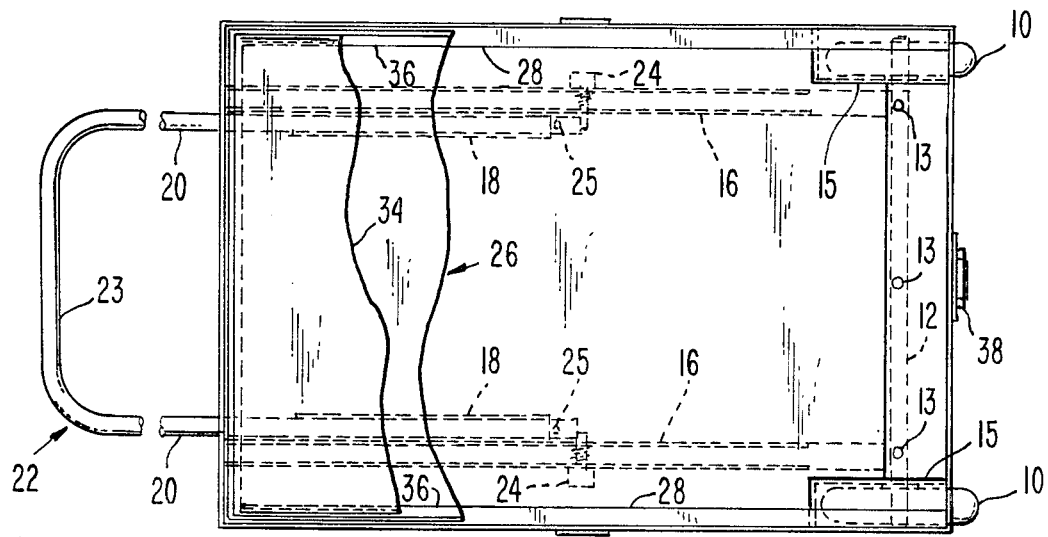
FIG. 3 is a top plan view, a portion of the cover and of the auxiliary receptacle being broken away, the handle being partly broken away.

When the handle is pulled outwardly to its use position shown in FIGS. 1 and 3, the outward movement is eventually limited by engagement of stop pins 25 against the inner ends of the support tubes 18. At this time, also, spring-urged plungers 24, mounted in the respective skids (see FIGS. 2 and 3), are biased laterally inwardly by the springs as soon as the side rails clear the plungers in the fully extended position of the handle shown in FIG. 1. The plungers 24 now extend in positions to prevent telescoping of the handle, while the pins 25 prevent further outward movement thereof, thus causing the handle to be locked in its extended, use position.

When the handle is to be telescoped to its inoperative position to facilitate storage of the device in a compartment C of a fire-fighting vehicle or the like, the plungers 24 are pulled outwardly, to permit the side rails to be adjusted inwardly, that is, to the right in FIG. 1, to an extent sufficient to completely recess the handle beneath the base receptacle.

It is important to note that time is of the essence in fire-fighting operations, and the device is designed to reduce to an absolute minimum the amount of time necessary to render the invention fully operational. One simply pulls out on the handle, without necessity of first unlocking it to permit its extension from its normally recessed, storage position. By simply pulling out on the handle, it moves to its extended position and locks automatically, thus saving time when even seconds count.

A second or auxiliary container 26 is also of upwardly opening, rectangular configuration, and is adapted to be removably supported upon support ledges 28 fixedly secured to the inner surfaces of the side walls of the base receptacle, adjacent the open top thereof (see FIG. 2). Ledges 28 extend the full length of the base receptacle in the illustrated example (FIG. 1), in supporting relation to the second or auxiliary receptacle.

The auxiliary receptacle, if used, is latched at both sides to the base receptacle by means of conventional, spring-restrained latches 30 provided upon the sides of the base receptacle, and engaging keepers 31 that are secured to the side walls of the second receptacle (FIGS. 1 and 2).

Similar keepers 32 are provided near the top of the second receptacle, engageable with keepers 33 welded or otherwise fixedly secured to a cover or lid 34 supported upon ledges 36 provided within the upper receptacle.

The several receptacles are provided with handles 38 to facilitate removal from the storage compartment C of the vehicle.

In the normal use of the device, and assuming that the storage compartment C is of a height sufficient to accommodate the device with one auxiliary receptacle as shown in FIG. 1, both the base receptacle and the auxiliary receptacle would be packed with selected items, as for example breathing apparatus, additional hose, or the like. With the receptacles pre-loaded and latched together as shown in FIGS. 1 and 2, the entire device can be stored in a compartment C the height, depth, and width of which is only slightly greater than that of the wheeled container comprising the present invention.

In the event a need arises for the wheeled pack or container, it is pulled out of the compartment by means of the handles 38, and the U-shaped handle 22 is pulled outwardly, automatically locking in its extended position as previously described herein. The fireman can then pull the device upstairs, across large expanses of floor surface, etc., with maximum ease and speed. On arrival at the operations area, the latches 30, 32 are quickly disengaged, the cover is removed, and the upper receptacle 26 is lifted off the base receptacle, providing access to the equipment in both receptacles.

Figure 4:
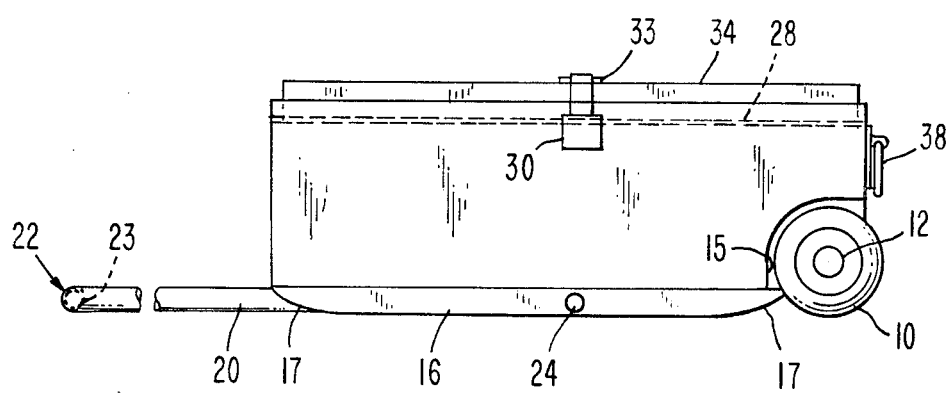
FIG. 4 is a side elevational view showing the device with the auxiliary receptacle removed and the cover latched directly to the base receptacle.

In some instances, it may not be desired to utilize a wheeled container having both a base and an auxiliary receptacle. This may be true, for example, in the event the compartment C is of relatively low height. In this event, one might utilize the arrangement shown in FIG. 4, wherein the cover is latched directly to the base receptacle, being supported upon the ledges 28 with the auxiliary receptacle omitted.

Or, in other instances, it may be possible to stack a second auxiliary receptacle upon the first one, this being considered sufficiently obvious as not to require special illustration. The modular design of the device permits these and various other arrangements, as will be readily appreciated.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A wheeled container, especially for use by fire-fighting and rescue squads and intended for compact storage when not in use in a compartment of a fire-fighting or rescue vehicle, comprising:
   (a) a base container including
      (1) a box-like receptacle adapted to hold a quantity of articles used in fire-fighting and rescue operations,
      (2) a pair of ground wheels mounted in recessed positions on said receptacle at one end thereof, and
      (3) handle means mounted on the receptacle for movement between recessed and extended positions; and
   (b) a cover removably supported upon and adapted to close said receptacle, said receptacle, cover, wheels, and handle means forming a generally rectangular assembly adapted to be disposed, when not in use, in a correspondingly shaped storage compartment of a fire-fighting or rescue vehicle, the handle means being in the form of a U-shaped member having side rails, the base container including a pair of tubes telescopically, slidably receiving the respective side rails, the base container further including a pair of skids mounted on the underside of the base container receptacle, the skids being in side-by-side relation to the side rails of the handle means, the base container including plungers mounted in the skids and adapted to releasably maintain the handle means in its extended position.

2. A wheeled container as in claim 1 in which the skids and wheels project downwardly below the underside of the base container receptacle with the skid projection being not less than that of the wheels.

3. A wheeled container as in claim 2 in which the skids have tapered ends merging into the underside of the receptacle of the base container.

4. A wheeled container as in claim 3 wherein the skids are generally coextensive in length with the receptacle of the base container.

5. A wheeled container as in claim 4 in which the tubes extend only for part of the overall length of said side rails.

6. A wheeled container, especially for use by fire-fighting and rescue squads and intended for compact storage when not in use in a compartment of a fire-fighting or rescue vehicle, comprising:
- (a) a box-like receptacle adapted to hold articles used in fire-fighting and rescue operations;
- (b) a pair of ground wheels mounted on said receptacle;
- (c) handle means mounted on the receptacle for movement between recessed and extended positions and including a pair of side rails;
- (d) a cover adapted to close said receptacle, said receptacle, cover, wheels, and handle means forming a generally rectangular assembly adapted to be disposed, when not in use, in a correspondingly shaped storage compartment of a fire-fighting or rescue vehicle;
- (e) a pair of tubes mounted on the underside of the receptacle to telescopically receive said sides rails;
- (f) a pair of skids mounted on the underside of the receptacle in side-by-side relation to the side rails; and
- (g) plungers mounted in the skids and adapted to releasably maintain the handle means in its extended position.

* * * * *